(12) United States Patent
Soerensen

(10) Patent No.: US 11,415,114 B2
(45) Date of Patent: Aug. 16, 2022

(54) OFFSHORE STRUCTURE AND METHOD FOR ATTACHING A TUBE OR CABLE TO AN APPLIANCE OF AN OFFSHORE STRUCTURE

(71) Applicant: SIEMENS GAMESA RENEWABLE ENERGY A/S, Brande (DK)

(72) Inventor: Johnny Soerensen, Videbæk (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 376 days.

(21) Appl. No.: 16/188,500

(22) Filed: Nov. 13, 2018

(65) Prior Publication Data
US 2019/0145385 A1 May 16, 2019

(30) Foreign Application Priority Data
Nov. 15, 2017 (EP) .................................. 17201918

(51) Int. Cl.
*F03D 80/80* (2016.01)
*E02B 17/00* (2006.01)
(Continued)

(52) U.S. Cl.
CPC .............. *F03D 80/85* (2016.05); *E02B 17/00* (2013.01); *F16L 1/032* (2013.01); *H02G 1/088* (2013.01); *H02G 1/10* (2013.01); *H02G 9/02* (2013.01); *H02G 9/12* (2013.01); *E02B 2017/0056* (2013.01); *E02B 2017/0091* (2013.01);
(Continued)

(58) Field of Classification Search
CPC .......... F03D 80/82; F03D 80/85; F03D 9/255; H02G 1/10; H02G 1/088; H02G 9/02; H02G 1/086; F05B 2240/95; E02B 2017/0091; Y02E 10/727; F16L 1/12
See application file for complete search history.

(56) References Cited

U.S. PATENT DOCUMENTS 4,914,960 A 4/1990 Kordahi
5,902,072 A 5/1999 Berges
(Continued)

FOREIGN PATENT DOCUMENTS

CN 105305329 A 2/2016
DE 102008028476 A1 12/2009
(Continued)

OTHER PUBLICATIONS

EP Communication Pursuant to Article 94(3) EPC dated Mar. 31, 2020 for EP Application No. 17 201 918.4.
(Continued)

*Primary Examiner* — Eldon T Brockman
*Assistant Examiner* — Danielle M. Christensen
(74) *Attorney, Agent, or Firm* — Schmeiser, Olsen & Watts LLP

(57) ABSTRACT

Provided is an offshore structure, especially offshore wind turbine, including a platform that is connected to the seabed, especially via a foundation that carries the platform, and an appliance, wherein it comprises guiding means for guiding at least one tube or cable along a guidance path from a respective entry point at which the tube or cable enters the platform to a respective connection point at which the tube or cable is connected or connectable to the appliance.

16 Claims, 4 Drawing Sheets

(51) Int. Cl.
*F16L 1/032* (2006.01)
*H02G 1/08* (2006.01)
*H02G 9/02* (2006.01)
*H02G 9/12* (2006.01)
*H02G 1/10* (2006.01)
*H02G 11/00* (2006.01)
*F03D 9/25* (2016.01)
*F16L 1/12* (2006.01)

(52) U.S. Cl.
CPC .......... *F03D 9/255* (2017.02); *F05B 2240/95* (2013.01); *F16L 1/12* (2013.01); *H02G 1/086* (2013.01); *H02G 11/006* (2013.01)

(56) References Cited

U.S. PATENT DOCUMENTS

| | | | | |
|---|---|---|---|---|
| 6,030,145 | A * | 2/2000 | Stewart, Jr. | E21B 17/015 405/171 |
| 6,082,710 | A | 7/2000 | Dragsund et al. | |
| 8,366,396 | B2 * | 2/2013 | Barton | F03D 80/85 416/146 R |
| 9,190,823 | B2 * | 11/2015 | Schubert | H02G 11/003 |
| 9,410,643 | B2 | 8/2016 | Moeller | |
| 9,431,803 | B2 * | 8/2016 | Borch-Jensen | H02G 3/0475 |
| 2011/0074155 | A1 * | 3/2011 | Scholte-Wassink | F03D 9/00 290/44 |
| 2011/0258829 | A1 | 10/2011 | Vanderbeke et al. | |
| 2012/0006578 | A1 * | 1/2012 | Schubert | F03D 80/70 174/79 |
| 2012/0133144 | A1 * | 5/2012 | Barton | F03D 80/85 290/55 |
| 2013/0183133 | A1 * | 7/2013 | Munk-Hansen | F16L 3/10 414/800 |
| 2015/0108764 | A1 * | 4/2015 | Moeller | F03D 9/257 290/55 |
| 2015/0260166 | A1 * | 9/2015 | Olesen | H02G 1/14 290/55 |
| 2020/0412111 | A1 * | 12/2020 | Van Hinsbergh | H02G 1/10 |

FOREIGN PATENT DOCUMENTS

| | | |
|---|---|---|
| EP | 2372143 A1 | 10/2011 |
| EP | 2597738 A1 | 5/2013 |
| EP | 2918828 A1 | 9/2015 |
| EP | 3086424 A1 | 10/2016 |
| JP | 2016063594 A | 4/2016 |
| NL | 1041049 B1 | 9/2016 |
| WO | WO 0039903 A1 | 7/2000 |
| WO | 2012044179 A1 | 4/2012 |
| WO | WO 2013050755 A2 | 4/2013 |

OTHER PUBLICATIONS

European Search Report dated May 2, 2018 for Application No. 17201918.4.

EP Communication Pursuant to Article 94(3) EPC dated Jun. 8, 2021 for EP Application No. 17 201 918.4.

* cited by examiner

OFFSHORE STRUCTURE AND METHOD FOR ATTACHING A TUBE OR CABLE TO AN APPLIANCE OF AN OFFSHORE STRUCTURE

CROSS-REFERENCE TO RELATED APPLICATIONS

This application claims priority to European Application No. 17201918.4, having a filing date of Nov. 15, 2017 the entire contents of which are hereby incorporated by reference.

FIELD OF TECHNOLOGY

The following concerns an offshore structure, especially an offshore wind turbine, comprising a platform that is connected to the seabed, especially via a foundation that carries the platform, and an appliance. Additionally, the following concerns a method for attaching a tube or cable to an appliance of an offshore structure.

BACKGROUND

Offshore facilities such as wind turbines mounted on offshore support structures tend to require connections to other offshore structures and/or onshore facilities, e.g. for transferring generated power to an onshore facility. It can also be advantageous to transport fluids or gas from or to an offshore structure. Undersea cables and/or tubes can be used to transport electricity, gas and/or fluids from or to such offshore structures. For these purposes sub-sea cables or tubes can be used that are running along the seabed or that are installed within the seabed by ploughing the seabed or by using horizontal drilling.

An alternative to a direct installation of a cable or a tube into the seabed is known from the document EP 3 086 424 A1. Empty tubes can be installed in the seabed and a cable can be pushed or pulled through those empty tubes to connect multiple offshore structures and/or an offshore structure to an onshore structure. The advantage of this approach is that un-armoured on-shore cables can be used that are less expensive and to some extend more flexible than armoured cables normally used for offshore installations.

When pulling-in cables for offshore installation, the normal procedure is to pull the cable vertically onto the platform. To provide an additional length of a cable to connect to a device the cables needs to be pulled to a higher position than the platform itself. This is achieved by building a scaffolding on the offshore platform and pulling the cable to the highest point of the scaffolding. This process is however rather time consuming and can be problematic due to the harsh conditions often encountered on open water.

SUMMARY

Embodiments of the invention improve the installation of undersea cables or tubes on offshore structures.

An aspect relates to an offshore structure, wherein the offshore structure comprises guiding means for guiding at least one tube or cable along a guidance path from a respective entry point at which the tube or cable enters the platform to a respective connection point at which the tube or a cable is connected or connectable to the appliance.

This solution is based on the idea to use the guiding means to at least partially define a guidance path along which the cable or tube can be pulled or pushed to the connection point. This approach allows for directly feeding the cable or tube along a curved path while still ensuring that the stress on the cable or tube is kept below a critical point that might lead to a damaging of the cable or tube, e.g. by ensuring that the bending radius of the cable or tube is not smaller than a given minimum value. The guiding means can be mounted to the platform and/or walls and/or a roof that are used to cover at least parts of the platform. It can especially be detachably mounted, e.g. if the guiding means is only used during installation of the offshore structure. In this case it can be disassembled after pulling the cable or tube onto the offshore structure and reused. The structure of the guiding means will be discussed in detail later.

The guidance path can be chosen in such a way that the cable or tube enters the platform via an opening in the platform essentially in a vertical direction. It can therefore pass through the floor of the platform at the entry point. This allows e.g. for pulling the tube or cable along a linear path from the seabed or a point close to the seabed to the platform. Since the majority of the path of the cable or tube is therefore linear only a low bending stress is induced on the tube or cable.

The connection to the appliance can be electrical in the case of a cable or fluidic with e.g. an air or fluid tight connection in the case of a tube. The guiding means can be used to guide a multitude of tubes or cables. If a power cable is guided by the guiding means a single cable can be sufficient to transport power to a different offshore structure or to an onshore station when a direct current power transmission is used. When three-phase alternating current is used typically three power cables are used, since a separate power cable is used per phase. This separate power cables could be guided by separate guiding means, it is however often advantageous to use the same guiding means for multiple cables or tubes when their connection points are close to each other.

The guiding means can only guide the tube or cable from one side and/or be open on at least one side to allow access to the cable or tube for service personal. Alternatively, it would be possible to completely close of the guidance path by the guiding means and/or to only allow access to the guidance path for service personal in defined sections of the guidance path.

The guiding means can guide the tube or a cable in such a way that the tube or cable enters the platform essentially orthogonally to the platform and/or essentially vertically at the entry point and that the tube or cable extends essentially in parallel to the platform and/or essentially horizontally at the connection point. This allows for a horizontal pulling of the cable or tube and therefore for a reduced height of the highest point that the cable or tube needs to reach during the installation. This is especially advantageous when the platform or at least the area of the platform that comprises the entry point is covered by a roof since only a limited height is available in this case to pull or push in the cable or tube. Guiding the cable such that a horizontal pull in or push in is possible also allows for a pull in or a push in without using a scaffolding or other techniques to pull or push the cable or tube to large heights above the platform.

The platform can be essentially horizontal. A cable or a tube can be considered to be essentially orthogonal to the platform when the angle between the platform and the tube or cable is at least 70°, 80° or 85°. The respective orientation can be considered to be essentially parallel when the angle between the cable or the tube and the platform is smaller than 5°, 10° or 20°. An orientation can be considered to be essentially horizontal or vertical when the angle between that orientation and the horizontal or vertical direction is smaller than 5°, 10° or 20°.

The offshore structure can comprise a device for pulling or pushing the tube or cable along the guidance path. This device can be mounted to the platform. It can be permanently mounted to the platform or be removed after installing the tube or cable. The device can e.g. be a winch that pulls a wire towards the winch that is connected to the tube or cable. The wire can be guided along the guidance path by the guiding means. The winch can e.g. be driven by a motor. The wire can be connected to the cable or tube by a releasable clamping mechanism, e.g. by a Chinese finger trap.

Alternatively the tube or cable could be pushed along the guidance path, e.g. by having a sled attached to the cable or tube that is driven within an outer tube in which the tube or cable is moved, e.g. the initially discussed tube that can be used to feed the wire or tube through the seabed, wherein the sled is pushed by e.g. water pressure.

The appliance can be an electrical appliance that is connected to the cable. It can e.g. be switching gear or a transformer of a wind turbine. It is also possible to use the cable for communication, e.g. an electrical cable or a cable for optical communication can be connected to communication equipment.

The guiding means can guide the tube or cable in such a way that a minimum bending radius of the tube or cable is increased by the guiding means. If the guiding means would not be used and the tube or cable would change its orientation between the entry point and the connection point the bending radius would be determined by the properties of the tube or the cable and the weight of the freely hanging section of the tube or cable. The cable would typically hang free between the entry point and the water surface or the seabed. This could lead to a small bending radius and therefore a large stress or strain on the tube or cable which could lead to defects of the tube or cable. By guiding the tube or cable along a predetermined path the minimum bending radius can be increased.

The guiding means can guide the tube or cable to a guidance point that has a larger distance to the platform and/or a larger vertical height than the connection point. The entry point can be closer to the platform and/or have a lower vertical height than the connection point. In other words, the guiding path can first climb to a relatively high guiding point and then descend again to the connection point. This shape of guiding path increases the length of wire that can be pulled onto the platform when the space on the platform or between the platform and the roof is limited. It can also serve to increase the minimum bending radius required to guide the tube or cable from the entry point to the connection point.

The guidance path can be curved in the horizontal plane and/or in a plane that is parallel to the platform. If the platform is horizontal both cases are obviously identical. The bending within the horizontal or the parallel plane allows to pull a larger length of tube or cable onto the platform when the space on the platform or within an enclosure of the platform is limited without reducing the bending radius too much.

The guiding means can comprise multiple rollers or groups of rollers spaced along the guidance path. As previously discussed the guiding means are preferably used during the installation of the tube or the cable, especially while the tube or cable is pushed or pulled along the guidance path. The use of multiple rollers or groups of rollers spaced along the guidance path allows for a clearly defined guiding path wherein the cable or tube can hardly deviate from the given guidance path while keeping the friction between the guiding means and the cable or tube low. It therefore allows for the pushing or pulling of the cable or tube with a relatively low resistance.

Rollers can be arranged on only one side of the guidance path, especially along the bottom of the guidance path. It is however also possible to further constrain the guidance path by adding rollers on the sides and/or on top of the guidance path.

The individual rollers can have an essentially cylindrical shape. The side of the rollers that faces the guidance path can have a concave shape which can help with centering the cable or tube or the multiple cables or tubes guided by the guiding means in the centre of the guidance path. In other cases, it might however be advantageous to use cylinders with a flat surface or that are concave.

The rollers or groups of rollers can be attached to the platform via at least one rod. The rods can be connected directly to the platform or to walls and/or a roof that are connected to the platform. The use of rods allows for simple means to position the rollers or groups of rollers or a component that carries the rollers or groups of rollers with respect to the platform. The guidance means and especially the rods can be detachably attached to the platform or to further components connected to the platform to allow a removal of the guidance system after installing the tube or cable.

The rollers or groups of rollers can be attached to a rigid or flexible frame that extends at least partially along the guidance path. The frame can be attached to the platform and/or the walls and/or the roof, e.g. via the previously discussed rods. A rigid frame can e.g. be implemented by using a metal frame that carries the rollers. A flexible frame can be provided by either using a flexible frame made e.g. from an elastomer or by adding joints between rigid segments of the frame.

The guiding means can comprise locking means to lock the tube or cable in place. The locking means can e.g. be clamps. Preferably multiple locking means along the guidance path are used to attach the cable or tube in several places. The attachment of the tube or cable to the guiding means can be used to store a spare length of cable or tube. If the cable or tube is damaged, some of the locking means can be released to provide a spare length of cable. The cable can then be shortened to remove the defect and reconnected to the appliance. This approach can be used to avoid the replacement of the complete cable or tube, when it is damaged.

The guiding means that comprises the locking means can be used to pull or push the cable or tube onto the platform and to the connection point as previously discussed. In this case the cable or tube can first be pulled into the structure and to the connection point and the locking means can then be locked to fix the cable or tube in place.

Alternatively, a first guiding means can be used to pull or to push the cable onto the platform and preferably to the connection point. The section of the cable or tube that was pulled onto the platform can then be transferred to second guiding means that comprise the locking means and locked in place on these guiding means.

The offshore structure can comprise a wind turbine. During the construction of wind turbines relatively long, stiff and heavy cables need to be pulled or pushed onto the offshore structure carrying the wind turbine to transfer power to other wind turbines or to an onshore power distribution station.

The guiding means can be used to guide a single cable or a tube to the connection point. It is however also possible to guide multiple tubes or cables that enter the offshore structure at the same entry point or at different, especially closely spaced, entry points to the same connection point or to, especially closely spaced, different connection points. E.g. three power cables of a three-phases AC-current can be guided by common guiding means.

The embodiment also relates to a method for attaching a tube or cable to an appliance of an offshore structure, comprising the steps:
Pushing or pulling the tube or cable onto a platform of the offshore structure at an entry point,
Using guiding means to guide the tube or cable along a guidance path to a connection point at which the tube or cable is connectable to the appliance, and
Connecting the tube or cable to the appliance.

The inventive method can preferably be performed using the offshore structure according to embodiments of the present invention. The method can also be expanded by the features discussed with respect to the inventive offshore structure and vice versa. The inventive method allows for easy installation of tubes or cables on an offshore structure, especially when the space on a platform or within an enclosure of a part of a platform is limited.

The guiding means can guide the tube or cable in such a way that the tube or cable enters the platform essentially orthogonally to the platform and/or essentially vertically at the entry point and that the tube or cable extends essentially in parallel to the platform and/or essentially horizontally at the connection point.

The tube or cable can be connected to a wire that extends along the guidance path, wherein the wire is pulled along the guidance path by a pulling device to pull the tube or cable along the guidance path. In other words, the wire can previously be placed onto or into the guiding means and therefore onto the guidance path. It can therefore pull the tube or cable along that guidance path. The wire is preferably guided by the guiding means.

The tube or cable can be attached to the guiding means via locking means to lock the tube or cable in place after guiding the tube or cable along the guidance path. Alternatively, the tube or cable can be transferred to further guiding means that guide the tube or cable along a further guidance path from the entry point to the connection point after guiding the tube or cable along the guidance path and locked in place by a locking means of the further guiding means.

The use of locking means to lock the cable or tube onto the guiding means or onto further guiding means in several places can be used to provide a spare length of tube or cable as previously discussed.

This additional length of tube or cable can be used in a method for fixing defects of the tube or cable. The tube or a cable can be disconnected from the connection point, at least one of the locking means can be released to provide a spare length of tube or cable, the tube or cable can be shorted to remove a section of the tube or cable comprising the defect and the tube or cable can be reconnected to the connection point.

BRIEF DESCRIPTION

Some of the embodiments will be described in detail, with references to the following Figures, wherein like designations denote like members, wherein.

DETAILED DESCRIPTION

Figure 1:
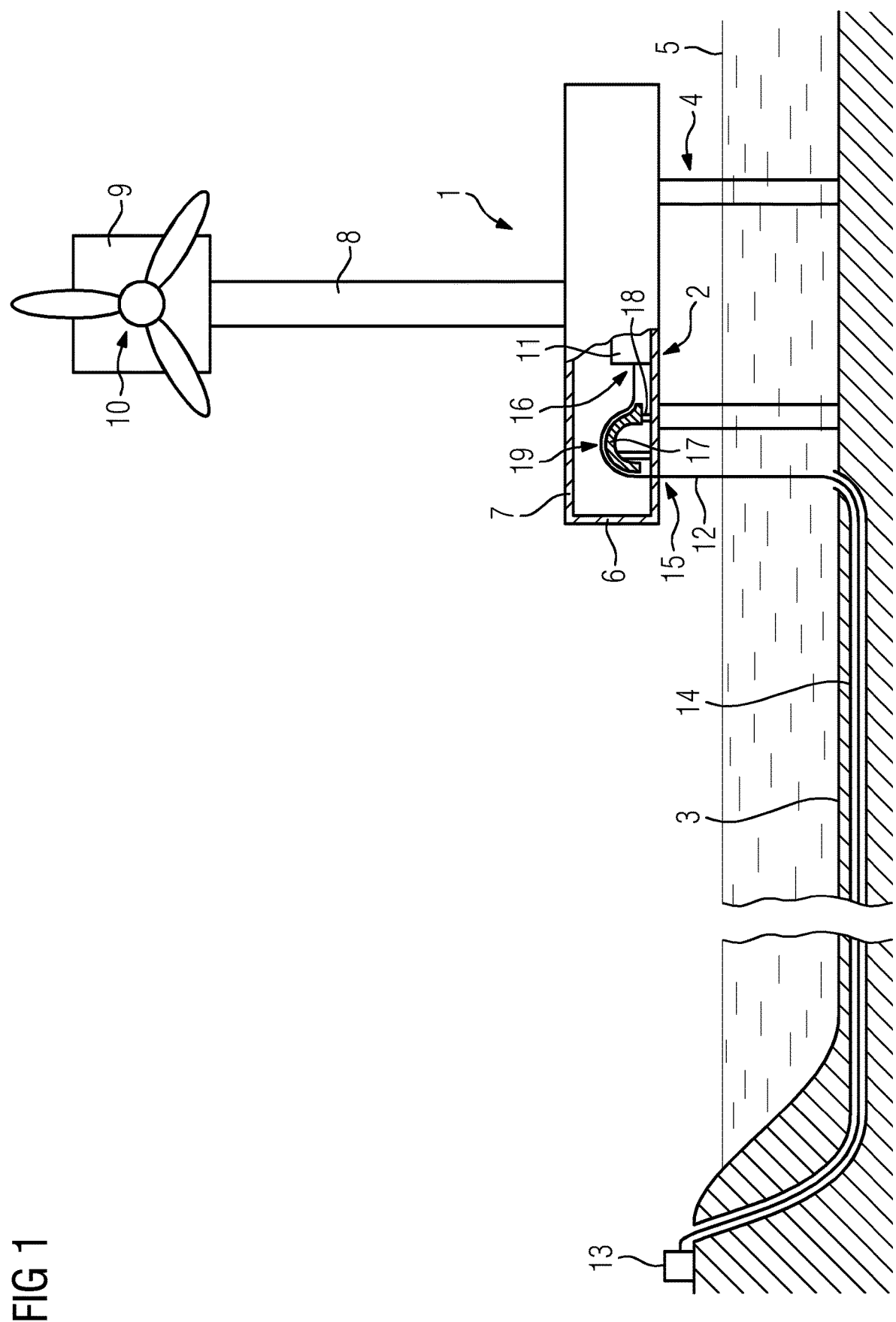
FIG. 1 shows an offshore structure that is an offshore wind turbine, in accordance with embodiments of the present invention.

FIG. 1 shows an offshore structure 1 that is an offshore wind turbine in the present example. The offshore structure 1 comprises a platform 2 that is connected to the seabed 3 via a foundation 4 that carries the platform 2. The surface area of the platform 2 is covered by walls 6 and a roof 7. In the shown example the platform 2 is completely covered by the walls 6 and the roof 7, it would however be possible to cover only parts of the platform 2 or to use a completely open platform 2.

The platform 2 also carries a tower 8 that in turn carries a nacelle 9 housing a wind turbine 10. The foundation 4 has a sufficient height to keep the platform 2 above the water level 5.

An appliance 11, e.g. a transformer or switching gear, of the offshore structure 1 is used to condition the power generated by the wind turbine 10. This power should then be transferred to an onshore station 13. Alternatively, it would be possible to first transfer the power to other offshore structures, e.g. to collect the power generated by multiple wind turbines. The cable 12 is used to transfer the power from the appliance 11 to the onshore station 13. In the example only one cable 12 is shown. This can be sufficient when using a DC power transmission between the appliance 11 and the onshore station 13. In other cases, multiple cables 12 can be used, e.g. three separate cables for three phases of an AC power transfer.

The example focuses on the connection of the offshore structure 1 to another facility via the cable 12. The same approaches that will be discussed can however also be used when a connection should be provided by a tube, e.g. when a fluid or gas should be transferred from the onshore station 13 to the appliance 11 or vice versa.

Since the cable 12 is running beneath the water level 5 an armouring of the cable 12 would typically be required if it would be installed on top of the seabed 3. In FIG. 1 an alternative approach is shown, wherein a hollow tube 14 is first installed below the seabed 3 and the cable 12 is then pushed or pulled through this hollow tube 14. Approaches for pushing or pulling the cable 12 through the hollow tube 14 will later be discussed with reference to FIGS. 5 and 6.

To land the cable 12 on the platform 2 the cable 12 is first pulled up vertically to an entry point 15 of the platform 2, e.g. a hole in the platform 2. Typically, an extended length of cable 12 will be pulled onto the platform 2 to allow for a connection to the appliance 11 or to allow for the storage of spare cable that can be used in the case of defects. If the cable 12 would be directly pulled from the entry point 15 to the connection point 16 at which the cable 12 is to be connected with the appliance 11, the weight of the cable 12 would result in a strong bending of the cable 12 in the area of the entry point 15 and/or in the area of the connection point 16. This strong bending might damage the cable 12. The same problem applies when landing tubes on the platform 2.

This problem is typically solved by vertically pulling the cable 12 for a certain distance above the platform 2, then clamping or otherwise fixing the cable 12 to the platform 2 and then only dealing with the shorter length of cable 12 that extends beyond the platform 2. To allow for a sufficient length of cable 12 to be pulled onto the platform 2 by a vertical pulling it is typically necessary to build a scaffolding on top of the platform 2. This is a time-consuming task. The additional length that could be pulled vertically onto the platform 2 can also be limited when a roof 7 is already installed above the entry point 15.

To avoid these problems a different approach is shown for a pulling the cable 12 onto the platform 2. The offshore structure 1 comprises guiding means 17 that could be permanently fixed to offshore structure 1 or that could only be used during the installation of the cable 12. The connection to the platform 2 can be provided by rods 18 that either connect directly to the platform as shown in FIG. 1 or that could connect to the walls 6 and/or the roof 7. The guiding means 17 define a guiding path for the cable 12 from the entry point 15 to the connection point 16. The guiding means 17 guides the cable 12 in such a way that the cable 12 enters the platform 2 essentially orthogonally to the platform 2 and therefore essentially vertically at the entry point 15 and that the cable 12 extends essentially parallel to the platform 2 and therefore horizontally at the connection point 16. The guiding means 17 guides the cable 12 in such a way that a compliance with a given minimum for the bending radius of the cable 12 is ensured by the guiding means 17. Therefore, the minimum bending radius is increased compared to the case where no guiding means 17 are used. Therefore, the stress and strain in the cable 12 are reduced.

One approach used to allow for a large bending radius is to first guide the cable 12 to a guidance point 19 that is positioned at a larger distance to the platform 2 and therefore at a larger vertical height than the connection point 16 and the entry point 15. This approach also allows for a larger amount of cables to be pulled onto the platform 2 when the space on the platform 2 is limited and a certain minimum bending radius should be ensured.

Figure 2:
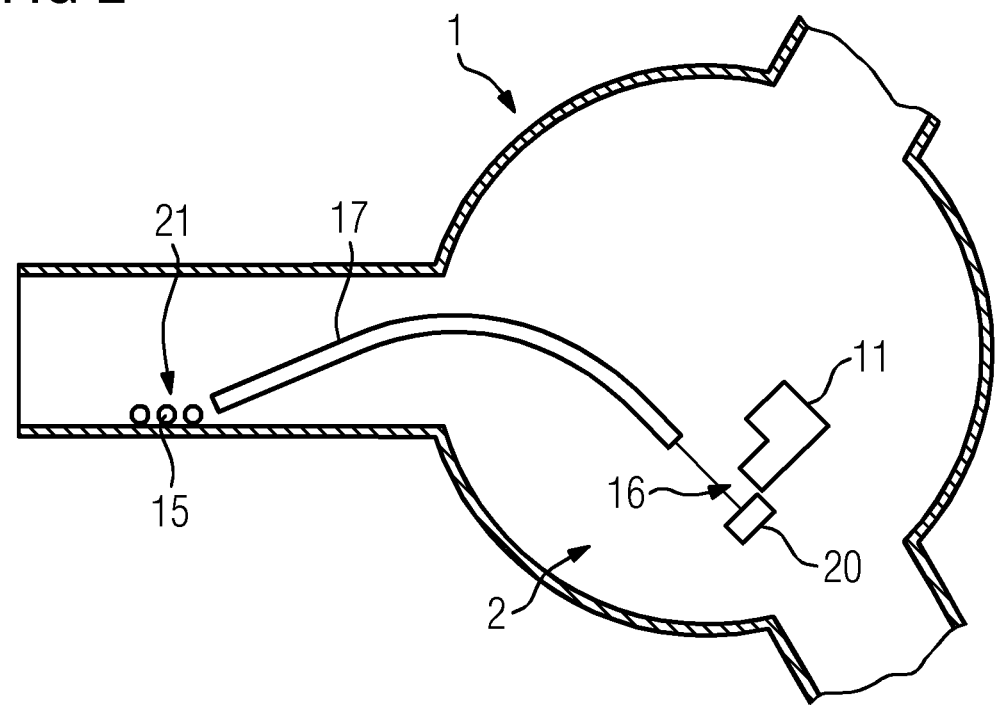
FIG. 2 shows a detailed, top view of a platform in FIG. 1, in accordance with embodiments of the present invention.

FIG. 2 shows a more detailed top view of the platform 2. For reasons of clarity the walls 6 and the roof 7 are not shown in FIG. 2. The platform 2 has several openings 21 that can serve as entry points 15 for the cable 12 or a different cable or tube. As clearly seen in FIG. 2 the guidance path that is defined by the guiding means 17 is curved in the horizontal plane and therefore in a plane that is parallel to the platform 2. This curvature in the horizontal plane can further increase the minimum bending radius during the guidance of the cable 12 or a tube and also allows to pull a larger amount of cable 12 or tube onto the platform 2 when the space on the platform 2 is limited without decreasing the resulting bending radius.

The offshore structure 1 comprises a device 20 for pulling the cable 12 or the tube along the guidance path defined by the guiding means 17. This can e.g. be a motor driven winch. The device 20 can pull the cable 12 in the vicinity of the connection point 16. The cable 12 can then be fixed in place, e.g. clamped to the guiding means 17, disconnected from the device 20 and connected to the connection point 16. Alternatively, the cable 12 could first be transferred from the guiding means 17 to a further guiding means as will be discussed later in detail with reference to FIG. 7.

Figure 3:
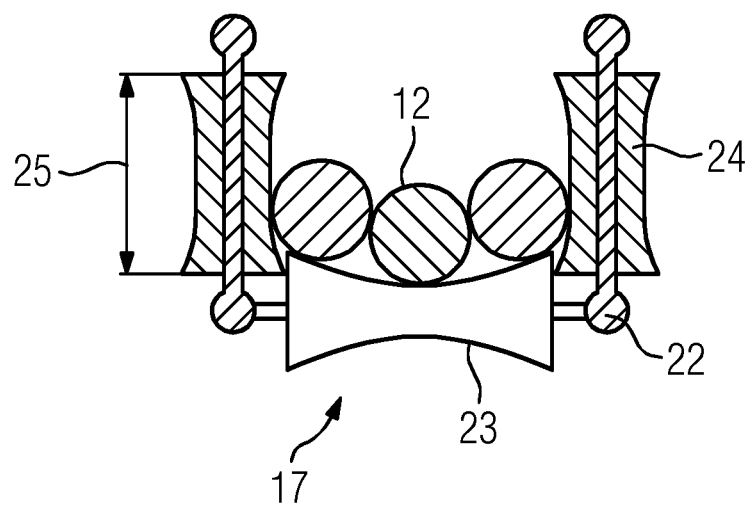
FIG. 3 shows a first view of short sections of a guiding means in FIG. 1, in accordance with embodiments of the present invention.
Figure 4:
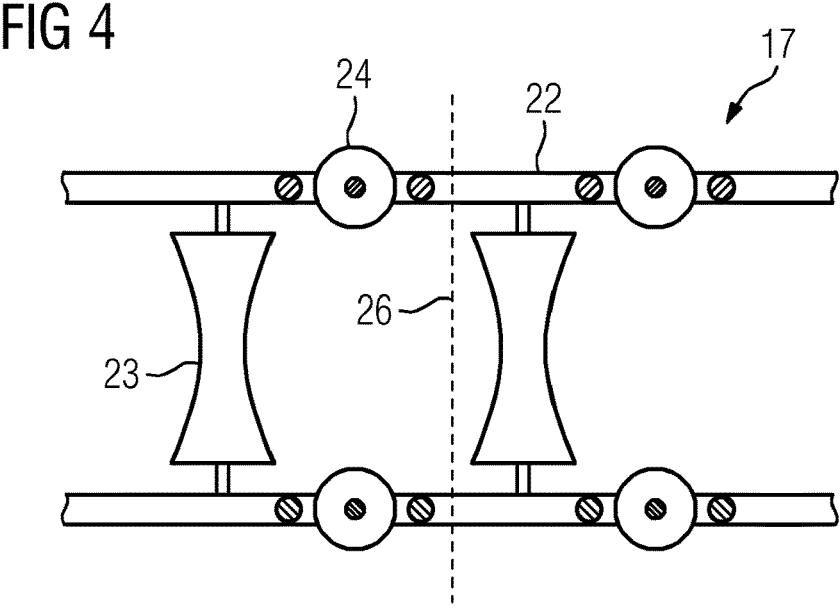
FIG. 4 shows a second view of short sections of a guiding means in FIG. 1, in accordance with embodiments of the present invention.

The structure of the guiding means 17 will now be explained in detail with reference to FIGS. 3 and 4. FIGS. 3 and 4 show different views of short sections of the guiding means 17. In the example three cables 12, e.g. for different phases of an AC power transfer, are guided by the guiding means 17. Obviously, it would be possible to modify the guiding means 17 to guide more than three cables 12 or less than three cables 12, e.g. only one cable 12. The guiding means 17 comprise a rigid frame 22 that carries horizontal rollers 23 and vertical rollers 24 that are spaced along the guidance path.

In FIGS. 3 and 4 a convex profile of the outer circumference of the rollers 23, 24 is shown. Such a profile can assist with the guidance and centering of the cables 12. Alternatively, it would be possible to use a cylindrical shape for the rollers 23, 24 with a straight outer profile or even rollers 23, 24 with a convex profile. It would also be possible to shorten all or some of the rollers 23, 24 to a shorter length 25. This is especially possible when only one cable 12 or one tube should be guided by the guiding means 17. The shown structure of the guiding means 17 allows for an exact definition of the guidance path the still allows access to the cables 12 by service personal, since the guiding means are open at the top. This can be advantageous during the installation process of the cables 12.

The use of horizontal rollers 23 and vertical rollers 24 reduces the friction when guiding the cables 12 along the guiding means 17. It could however also be possible to not use any rollers 23, 24 and e.g. only use a flat surface as guiding means with or without a lubricant to reduce a friction or to only use the vertical rollers 23. The frame 22 can be attached to the platform 2, the walls 6 and/or the roof 7 with the rods 18 shown in FIG. 1.

If the guiding means 17 should be used to guide several cables 12 and/or tubes onto the platform 2 along different guidance paths and/or if the guiding means 17 should be reused in different offshore structures 1, it is advantageous if the guiding means 17 is at least partially flexible. One approach to allow for this flexibility is to introduce joints, e.g. at the position shown by the line 26 in FIG. 4, between rigid sections of the guidance means 17. Alternatively, it would e.g. be possible to use an elastic material for the frame 22.

Figure 5:
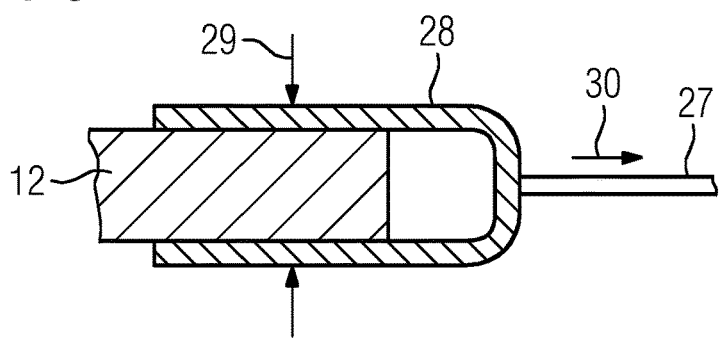
FIG. 5 shows a possible approach for pulling a cable onto the platform and along the guidance path, in accordance with embodiments of the present invention.

FIG. 5 shows a possible approach for pulling the cable 12 onto the platform 2 and along the guidance path 17. A wire 27 can be drawn along the guidance path and exit the platform 2 at the entry point 15. At the end of the wire 27 a sleeve 28 can be provided that can be placed around the end of the cable 12. By an appropriate design of the sleeve 28 the diameter of the sleeve 28 can be reduced as shown by the arrows 29 when a force is exerted in the direction of the arrow 30 by pulling the wire 27. This kind of sleeve is known in the art as "Chinese finger trap". The device 20, e.g. a winch, can then be used to pull in the wire 27 and therefore pull up the cable 12 or a tube from the seabed 3 or a boat floating on the surface of the water to the platform 2 and then pull it through one of the openings 21 and along the guidance path to pull it in the vicinity of the desired connection point 16. This approach can even be extended, and the wire can be used to pull the cable 12 or a tube through the hollow tube 14 shown in FIG. 1.

Figure 6:
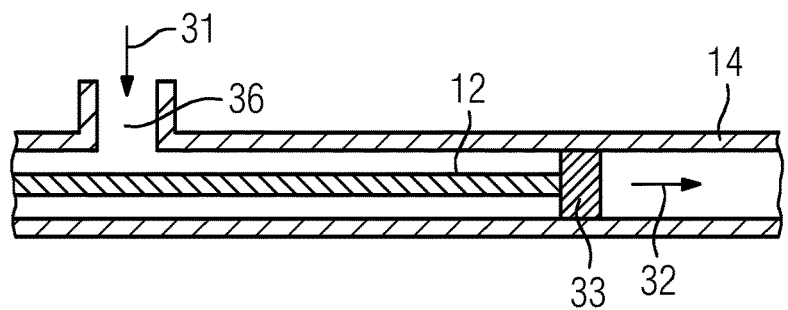
FIG. 6 shows another possible approach for pulling a cable onto the platform and along the guidance path, in accordance with embodiments of the present invention

Alternatively, the cable 12 or a tube can be pushed through the hollow tube 14 and once the cable 12 or the tube contacts on the guiding means 17 be also be pushed along the guidance path. A possible approach for pushing the cable 12 is shown in FIG. 6. The cable 12 is connected to a sled 33 or several of the sleds 33, wherein some of the sleds 33 can be placed further along the wire to allow for a pushing of the wire even if the end of the wire already left the hollow tube 14. Through an opening 36 in the hollow tube 14 e.g. air or water can be introduced in the hollow tube 14 at high pressure as shown by the arrow 31. This high pressure pushes the sled 33 to the right as shown by the arrow 32.

Figure 7:
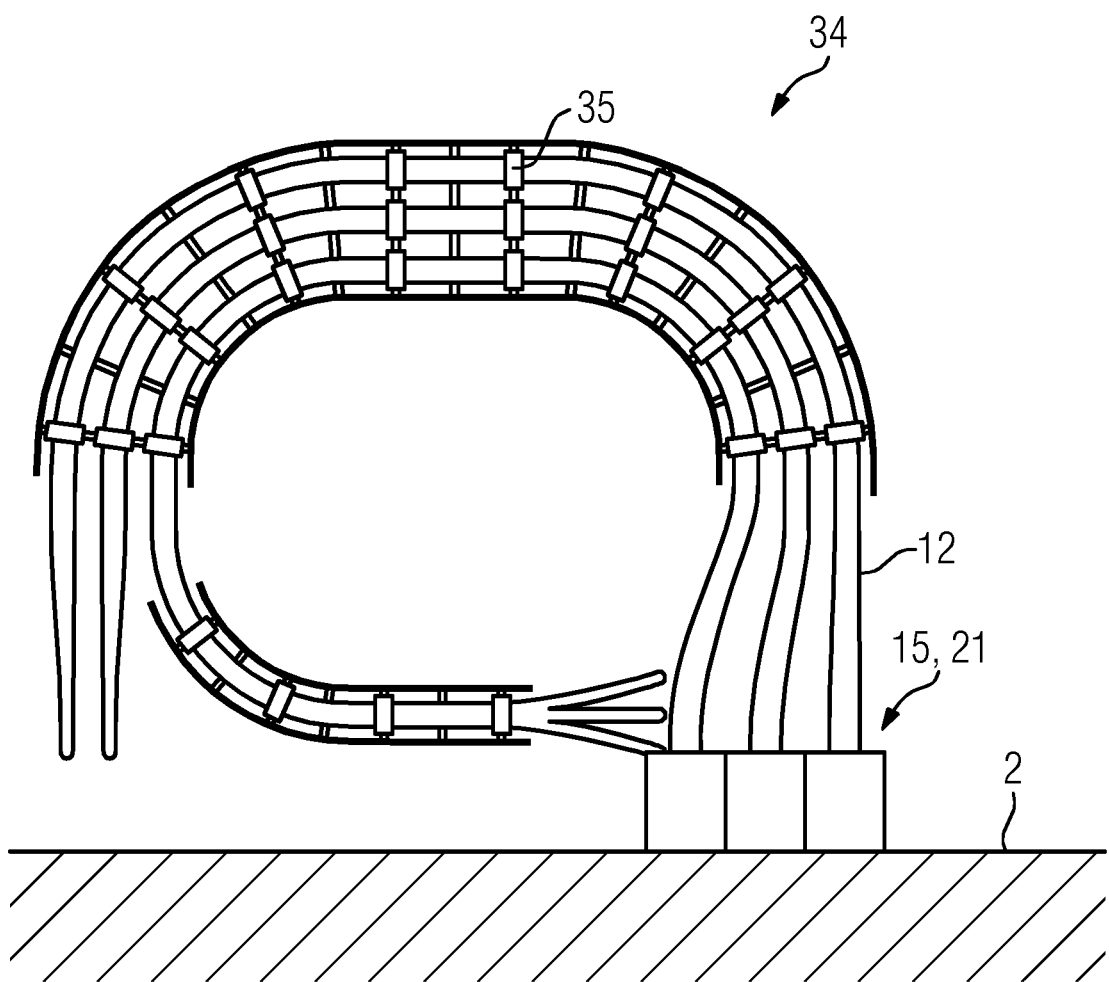
FIG. 7 shows a further guiding means that can be used to store a spare length of cable or tube once a cable or tube is pulled onto the offshore structure, in accordance with embodiments of the present invention.

As previously discussed the cable 12 or the tube can be transferred to a further guiding means 34 that is shown in FIG. 7 after being pulled onto the platform 2. The length of the cable 12 that is pulled onto the platform 2 can, e.g. manually by a worker, be lifted from the guiding means 17 to the further guiding means 34. The cable 12 can then be locked in place by locking means 35, e.g. clamps, of the further guiding means 34. The further guiding means 34 can especially serve to store a certain additional length of cable on the platform 2 while ensuring that a bending radius of the cable 12 is not a reduced below a minimum radius. Instead of using the further guiding means 34 to secure the cables 12 it would also be possible to use locking means that are provided on the guiding means 17.

If one of the cables 12 or a tube that is attached to a guiding means 17, 34 is damaged, one or several of the locking means 35 can be opened or removed to provide a spare length for the cable 12 or the tube. The cable 12 or the tube can then be shortened and reattached to the appliance. This can in many cases avoid the necessity of pulling a completely new cable or tube onto the platform 2.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. An offshore wind turbine structure comprising:
a platform that is connected to a seabed via a foundation that carries the platform;
an appliance located on the platform; and
a guiding means for guiding at least one tube or cable along a guidance path from a respective entry point at which the at least one tube or cable enters the platform to a respective connection point at which the at least one tube or cable is connected or connectable to the appliance on the platform;
wherein the guiding means guides the at least one tube or cable in such a way that a minimum bending radius of the at least one tube or cable is increased by the guiding means;
wherein the guidance path is curved in the horizontal plane and/or a plane that is parallel to the platform.

2. The offshore wind turbine structure according to claim 1, wherein the guiding means guides the at least one tube or cable in such a way that the at least one tube or cable enters the platform orthogonally to the platform and/or vertically at the entry point and that the at least one tube or cable extends in parallel to the platform and/or horizontally at the connection point.

3. The offshore wind turbine structure according to claim 1, further comprising a device for pulling or pushing the at least one tube or cable along the guidance path.

4. The offshore wind turbine structure according to claim 1, wherein the guiding means guides the at least one tube or cable to a guidance point that has a larger distance to the platform and/or a larger vertical height than the connection point.

5. The offshore wind turbine structure according to claim 1, wherein the guiding means comprises multiple rollers or groups of rollers spaced along the guidance path.

6. The offshore wind turbine structure according to claim 5, wherein the multiple rollers or groups of rollers are attached to the platform via at least one rod.

7. The offshore wind turbine structure according to claim 5, wherein the multiple rollers or groups of rollers are attached to a rigid or flexible frame that extends at least partially along the guidance path.

8. The offshore wind turbine structure according to claim 1, wherein the guiding means comprises locking means to lock the at least one tube or cable in place.

9. The offshore wind turbine structure according to claim 1, wherein the offshore structure comprises a wind turbine.

10. A method for attaching a tube or cable to an appliance located on a platform of an offshore structure, comprising:
pushing or pulling the tube or cable onto a platform of the offshore structure at an entry point;
using a guiding means to guide the tube or cable along a guidance path to a connection point at which the tube or cable is connectable to the appliance on the platform, wherein the guiding means guides the tube or cable in such a way that a minimum bending radius of the tube or cable is increased by the guiding means; and
connecting the tube or cable to the appliance;
wherein the guiding means guides the tube or cable in such a way that the tube or cable enters the platform orthogonally to the platform and/or vertically at the entry point and that the tube or cable extends in parallel to the platform and/or horizontally at the connection point.

11. The method according to claim 10, wherein the tube or cable is connected to a wire that extends along the guidance path, wherein the wire is pulled along the guidance path by a pulling device to pull the tube or cable along the guidance path.

12. The method according to claim 10, wherein the tube or cable is attached to the guiding means via locking means to lock the tube or cable in place after guiding the tube or cable along the guidance path or in that the tube or cable is transferred to further guiding means that guide the tube or cable along a further guidance path from the entry point to the connection point after guiding the tube or cable along the guidance path and locked in place by a locking means of the further guiding means.

13. An offshore wind turbine structure comprising:
a platform that is connected to a seabed via a foundation that carries the platform;
an appliance located on the platform; and
a guiding means for guiding at least one tube or cable along a guidance path from a respective entry point at which the at least one tube or cable enters the platform to a respective connection point at which the at least one tube or cable is connected or connectable to the appliance on the platform;

wherein the guiding means guides the at least one tube or cable in such a way that a minimum bending radius of the at least one tube or cable is increased by the guiding means;

wherein the guiding means guides the at least one tube or cable in such a way that the at least one tube or cable enters the platform orthogonally to the platform and/or vertically at the entry point and that the at least one tube or cable extends in parallel to the platform and/or horizontally at the connection point.

14. The offshore wind turbine structure according to claim 13, further comprising a device for pulling or pushing the at least one tube or cable along the guidance path.

15. The offshore wind turbine structure according to claim 13, wherein the guiding means comprises multiple rollers or groups of rollers spaced along the guidance path.

16. The offshore wind turbine structure according to claim 13, wherein the offshore structure comprises a wind turbine.

* * * * *